United States Patent
Jonsson

(10) Patent No.: US 7,656,868 B2
(45) Date of Patent: Feb. 2, 2010

(54) METHOD FOR TRANSFERRING PACKETS IN NETWORKS COMPRISING A PLURALITY OF LINKED INTERMEDIATE NETWORKS

(75) Inventor: Bjorn Jonsson, Saltsjobaden (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 452 days.

(21) Appl. No.: 10/586,975

(22) PCT Filed: Jan. 30, 2004

(86) PCT No.: PCT/SE2004/000123

§ 371 (c)(1),
(2), (4) Date: Jul. 22, 2006

(87) PCT Pub. No.: WO2005/074210

PCT Pub. Date: Aug. 11, 2005

(65) Prior Publication Data

US 2008/0137653 A1    Jun. 12, 2008

(51) Int. Cl.
*H04L 12/28*    (2006.01)
(52) U.S. Cl. .................. 370/389; 370/354; 370/356; 370/373; 370/401
(58) Field of Classification Search .................. None
See application file for complete search history.

(56) References Cited

U.S. PATENT DOCUMENTS

| | | | | |
|---|---|---|---|---|
| 6,415,329 B1 * | 7/2002 | Gelman et al. | ............... | 709/245 |
| 6,502,135 B1 * | 12/2002 | Munger et al. | ............... | 709/225 |
| 6,882,643 B1 * | 4/2005 | Mauger et al. | ............... | 370/389 |
| 7,035,259 B2 * | 4/2006 | Nomura et al. | ............... | 370/392 |
| 7,046,669 B1 * | 5/2006 | Mauger et al. | ............... | 370/393 |
| 7,088,681 B2 * | 8/2006 | Ladegaard | ............... | 370/236 |

(Continued)

FOREIGN PATENT DOCUMENTS

| | | |
|---|---|---|
| CA | 240632 A1 | 12/1999 |
| EP | 1164754 A1 | 12/2001 |
| WO | WO 02078283 A2 | 10/2002 |

*Primary Examiner*—Pankaj Kumar
*Assistant Examiner*—Ajay P Cattungal
(74) *Attorney, Agent, or Firm*—Roger S. Burleigh

(57) ABSTRACT

The invention relates to a method, devices and system for transit of information over packet switched networks, in particular for transit of an end-to-end connection over a plurality of such networks (1', 1, 1") using a transit method that is independent on the network technology used in the different networks. An end-to-end service node (21) selects the networks and links an end-to-end connection shall traverse. To each network an incoming transit node (2) and an outgoing transit node (3) are connected. Between these a leg of the end-to-end connection is transited. The outgoing transit node has a list (37) of transit tags used for identification of a packet flow related to the connection. A transit tag is selected from the list and is signalled to the incoming transit node together with the local address of the outgoing transit node. At the incoming transit node incoming packets are analyzed with regard to the presence of a local identifier (e.g. called a link tag). In the incoming transit node packets with the local identifier are subjected to a special treatment. Its payload is put in the payload of a new packet that is formatted according to the network technology used in the network, and as destination of the new packet is the address of the outgoing transit node used. The new packet is marked with the transit tag. Finally the new packet is injected into the network and is routed therein according to that network's routing mechanisms. When the new packet arrives at the outgoing transit node its transit tag is used as incoming identifier.

23 Claims, 11 Drawing Sheets

U.S. PATENT DOCUMENTS

| | | | |
|---|---|---|---|
| 7,127,237 B2 * | 10/2006 | Naruse et al. | 455/415 |
| 7,209,491 B2 * | 4/2007 | Zheng et al. | 370/477 |
| 7,324,510 B2 * | 1/2008 | Howe | 370/386 |
| 7,359,377 B1 * | 4/2008 | Kompella et al. | 370/389 |
| 7,391,760 B1 * | 6/2008 | Caldwell et al. | 370/352 |
| 7,480,283 B1 * | 1/2009 | Sylvain | 370/352 |
| 2002/0181462 A1 * | 12/2002 | Surdila et al. | 370/392 |
| 2003/0118019 A1 * | 6/2003 | Mark et al. | 370/392 |
| 2003/0227917 A1 * | 12/2003 | Maher et al. | 370/392 |
| 2004/0202148 A1 * | 10/2004 | Kuehnel | 370/352 |
| 2005/0036517 A1 * | 2/2005 | Larmala et al. | 370/502 |
| 2005/0177749 A1 * | 8/2005 | Ovadia | 713/201 |
| 2007/0019621 A1 * | 1/2007 | Perry et al. | 370/352 |
| 2007/0165668 A1 * | 7/2007 | Liu | 370/466 |

* cited by examiner

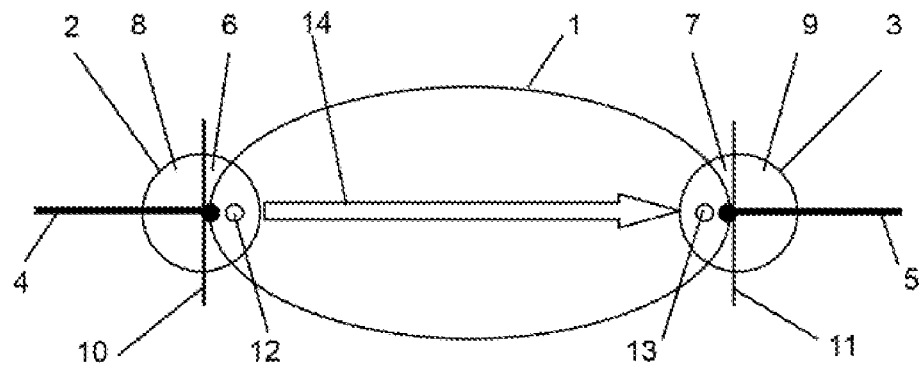

1. Intermediary Network
2. Incoming Transit Node/Departure Node
3. Outgoing Transit Node/Arrival Node
4. Incoming Link
5. Outgoing Link
6. Inward Portion of Transit Node
7. Inward Portion of Transit Node
8. Outward Portion of Transit Node
9. Outward Portion of Transit Node
10. Incoming Interface
11. Outgoing Interface
12. Departure Functionality
13. Arrival Functionality
14. End-to-End Path

FIG 1

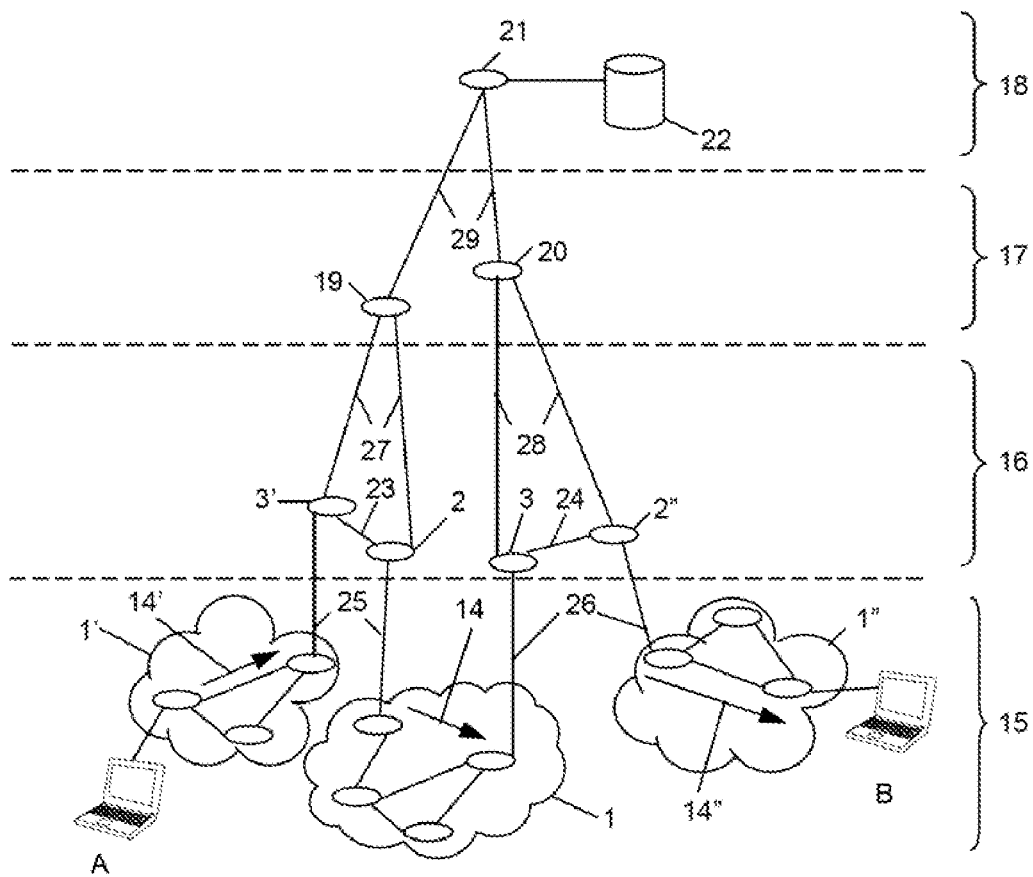

| 15. | Network Layer |
| --- | --- |
| 16. | Transit Node Layer |
| 17. | Transit Control Node Layer |
| 18. | End-to-End Service Node Layer |
| 19. | Transit Control Node |
| 20. | Transit Control Node |
| 21. | End-to-End Service Node |
| 22. | Data Base |
| 23. | Link |
| 24. | Link |
| 25. | Links or Direct Connections (lines) |
| 26. | Links or Direct Connections (lines) |
| 27. | Signalling Links |
| 28. | Signalling Links |
| 29. | Signalling Links |
| A | Host |
| B | Host |
| 1 | Intermediary Network |
| 2 | Incoming Transit Node |
| 3 | Outgoing Transit Node |
| 14 | Leg |

FIG 2

2  Incoming Transit Node
3  Outgoing Transit Node
31 Consolidated Node

19  Transit Control Node

1   Intermediary Network
2   Incoming Transit Node
3   Outgoing Transit Node
14  Leg 1 Intermediary Network
2 Transit Node
13 Transit Control Node A Host
B Host
52 End-to-End Service Node
53 End-to-End Service Node
54 Transit Control Node
55 Transit Control Node
56 Transit Node
57 Transit Node
58 Intermediary Network
59 Intermediary Network
60 Intermediary Network
61 Intermediary Network
63 End-to-End path
64 End-to-End path
65 Transit Node
66 Transit Node
67 Link
68 Transit Tag Signall
69 Link Tag

METHOD FOR TRANSFERRING PACKETS IN NETWORKS COMPRISING A PLURALITY OF LINKED INTERMEDIATE NETWORKS

TECHNICAL FIELD

A method for transit of information end-to-end over a plurality of intermediate networks, wherein the intermediary networks may use different networking technologies. The invention also relates to network nodes for use in the transit method.

STATE OF THE ART

Communication networks have achieved an almost explosive increase in performance over the years. Communication networks interconnect computing nodes (hosts).

Modern communication networks are designed in a highly structured way. To reduce their design complexity networking functionality is organized as a series of layers (a pile of layers is commonly described as a stack). The number of layers, the name of each layer, the contents of each layer, and the function of each layer may differ from network to network. Layer n of the communications stack in one network node carries on a conversation with layer n on another network node. The rules and conventions used in this conversation are collectively known as the layer n protocol. In reality no data are directly transferred from layer n on one network node to layer n on another network node. Instead, each layer passes data and control information to the layer immediately below it, until the lowest layer, layer 1, is reached. Below layer 1 is the physical medium through which actual communication occurs.

Layer 1 is the physical layer which is concerned with transmitting bits over a communication channel, the medium used for the physical connection, and physical contacts. Over the physical layer is the data link layer, which is concerned with how the physical connection is used for transmission of information. Framing (identifying the start and end of separate information entities) is of concern here.

A network can be formed by allowing several network nodes to share a common medium. If there are many communicating units that shall share the common medium, addressing must be handled in order to direct information to the intended receiver of information. Several separate data flows between a sender and a receiver may be handled by introducing logical channels on data links. In order to avoid collisions on a shared medium a mechanism must be introduced to control access to the medium so that only one network node at a time is allowed to use the medium at a particular instant. The so-called medium access protocol, e.g. the MAC protocol 802.11, provides this functionality. The addresses used for link layer addressing are physical addresses, and these addresses are local to the network that uses the physical medium. If several such physical networks use the same technology on the data link layer, the networks can be interconnected using bridges, switches etc., and the resulting network can extend over large areas and can comprise a large number of network nodes.

Several networks that use different technologies on the data link layer can be interconnected if a network protocol suite, for short called the IP protocol suite, is used. The IP protocol is thus used for internetworking. Over the link layer is the network layer that is a logical layer that defines the network-layer addressing that is used for inter-networking. The addresses used are logical addresses.

To-day end-to-end connections are by preference built either by IP based networking or by overlay networks defined on top of an IP-technology platform.

The IP protocol allows for improvements on protocols and hardware beneath the IP level, and also allows for new applications on higher levels. Improvements of technologies below the IP layer only have local consequences. However, if improvements in protocols and hardware on a level on and above the IP level are to take effect along an end-to-end path over several networks, they have to be compatible with all involved networks, which is a problem. In practice this means that the improvement needs to be subject to global coordination. As an example the standardized RSVP protocol (bandwidth reservation protocol) allows for reservation of bandwidth for a data flow in a network. If bandwidth reservation is desired for an end-to-end path the RSVP protocol must be implemented in all intermediate networks along the path.

The present invention offers a solution to the problem related to protocol improvements that have to be compatible with all intermediary networks, in that the IP protocol is not required for an end-to-end path, but each intermediary network uses its own technology. It does not matter which technology an individual operator uses to achieve this. Any improvement in the network design of an intermediary network will be reflected in the leg that traverses this intermediary network. Network operators will thus be given an incitement to improve their networks and to provide differentiated offerings competing with one another by introducing more competitive network solutions and services.

In the following the term "networking" refers to all aspects of network provisioning, its transmission technology, its connectivity, its transport mechanism, its behaviour, its software and hardware as well as its management and the organization operating it.

With the IP based networking the routing of packets is by default a matter handled internally by the networks by information exchange between the routers inside the networks. There are methods, such as source routing, which permit a sending host to define the route a packet should follow by specifying the sequence of routers that should be passed. This, however, requires that the sending host has the necessary knowledge about the properties of the intermediary networks. This is a problem since a host hasn't this information.

With IP based interconnected networks no single organization is responsible for end-to-end connections, for example if errors occur, such as whether the bandwidth reserved with the RSVP protocol also will be fulfilled along the end-to-end path.

A network operator has good reasons for being able to compete with the specifications of his network in order to attract traffic to his network. With the IP based internetworking of today a network operator has little incitement for this, because the sending host cannot select the intermediary networks that lead to the receiving host. If for example an operator operates his network more efficient than other operators of similar networks, he wants to be able to attract traffic to his network, since he can provide connections with the appropriate properties at a less cost than what the other operators do.

On the Internet, which is the union of connected IP based networks using different underlying technologies; a packet is routed from source host A to destination host B using the IP address of the destination host. This is a drawback since each host must have a globally unique IP address. There are only $2^{32}$ IP addresses available with the IPv4 protocol. With the exploding use of Internet the IPv4 addresses begin to become scarce. Therefore the new standard IPv6 is discussed which has $2^{128}$ globally unique addresses. There is no single established method how to mix IPv4 networks with IPv6 networks along an end-to-end path. Therefore IPv6 has only been implemented locally on the Internet. The complete transition from IPv4 to IPv6 is difficult since all networks cannot implement Ipv6 simultaneously. So this problem boils down to the same problem as discussed previously; an improvement must be implemented in all of the networks in the end-to-end path for the improvement to work.

Supervision of the quality of an Internet connection is a complex matter, particularly in en environment of several independent networks which need to be coordinated in order in order to perform quality measurements. There are DOS commands "ping" and "traceroute" with which a user can use to check some quality aspects of an Internet connection. Other computer systems may have similar commands. The "ping" approach reflects the total delay of all intermediary networks at one particular time instant. The "traceroute" that can be used to find out which route a sent packet has followed to a specific destination. In practice "ping" and "traceroute" can only be used for occasional active probing of specific routes. Also, assessment of the properties of different networks can only be based on probing from the sender (of probes), not on measurements on the aggregated traffic flows from many different sources. To-day a user has to trust that each individual network operator also delivers what he claims.

The IP internetworking approach suffers from the following drawbacks: (1) A host cannot select the information it wants to receive, because once a hosts is connected to Internet the host is reachable by anybody. Other users can send unwanted information to the host, such as for example advertisements, spam etc., or the host may be flooded by unwanted traffic (denial of service attacks). With the present invention the receiving host can select the information it wants to receive and keep all other traffic blocked by using receiving end admission control. (2) If many hosts share a common connection to the Internet there is no simple method to distribute the connection costs proportionally to the bandwidth used by the individual hosts. With the present invention costs can be tracked based on individual data flows and differentiated service properties. (3) IP based networks do not inherently support mobility. If for example the receiving host of an end-to-end path is mobile and changes its access point, then the destination address is changed. The transmitted information will then not reach the receiving host unless it is redirected.

Another approach to the inter-network communication problem is to use overlay networks. An overlay network interconnects several existing networks, called intermediary networks below, with one another and uses the connectivity of these in order to set up an end-to end connection that traverses the intermediary networks. With connectivity is meant the network's ability to transfer information from one point of another in the network.

An overlay network comprises a number of nodes/computers that communicate using a common protocol. Two or more such computers/nodes are connected to each individual intermediary network, one at the arrival side and one at the departure side of a connection that traverses the intermediary network. An overlay network is typically built, maintained and driven by an organization that e.g. has many offices/plants scattered around a region or the world. The individual intermediary networks are typically maintained and driven by individual operators that are independent of the overlay network organization.

An overlay network is described in our PCT applications PCT/EP01/05647 and PCT/EP01/05648. The overlay network is IP-based and comprises plurality of nodes which are connected to intermediary networks which all are IP-based. All packets used for transportation of data are IP-packets. The overlay network has a central node that selects the intermediary networks to be used for an end-to end connection. The central node can supervise the intermediary networks and monitor their individual QoSs (quality of services). If the delivered QoS is not the one promised by the operator the central node may select another intermediary network.

In order to be able to send information between the intermediary networks with the aid of the overlay network, the nodes of the overlay network must be driven by one and the same operator. But it is not practical for a single operator to have so many overlay network nodes that his overlay network can connect to all intermediary networks around the globe.

SUMMARY OF THE INVENTION

The present invention focuses on end-to-end connections. An end-to-end connection or path extends from host A in one network to a host B in another (or the same) network. Typically an end-to-end path extends over several networks interconnected with links. The part of an end-to-end path that traverses an individual intermediary network is called a leg. An end-to-end path thus comprises several legs interconnected with links.

The present invention proposes a mechanism for linking networks so that an end-to-end connection can be established without being constrained to IP networking or to traditional overlay networks. The invention provides no means for controlling the internal path a packet flow will take within an intermediary network but provides the means and methods for selecting and controlling which intermediary networks an end-to-end path shall traverse. According to the invention the final destination address of an end-to-end connection is not used for the end-to-end routing of information; instead an end-to-end connection is composed of a sequence of transit legs that each uses local addresses for traversing intermediary networks. The legs forming an end-to-end connection are linked together by control from an end-to-end service. In the following this service is executed in an end-to-end service node. In the alternative the end-to-end service is distributed over several end-to-end service nodes.

The present invention offers a solution to the problem that the sending host must have the necessary knowledge about the properties of the intermediary networks. In accordance with the invention a host (or an agent supporting the host) sends a connection request to the end-to-end service node and indicates therein the specific requirements for an information transfer by specifying properties such as bit rate, jitter, delay, synchronization, management etc. In response to the request the end-to-end service node selects intermediary networks that fulfil the requirements, or the networks whose operators at least say their networks provide the required specifications. By handling transit services for a large number of hosts one and the same end-to-end service node can also supervise the performance of different networks and compile information that support the selection of the most optimal routes for traffic with different requirements.

With the present invention the problem that no single organization is responsible for end-to-end connections is solved in that the end-to-end service node is made responsible for the end-to-end path. To this end the end-to-end service node continuously monitors the behaviour of each network involved in the end-to-end path. If a network doesn't have the qualities its operator claims it has, the end-to-end service node can redirect the traffic from the misbehaving network to another intermediary network.

The present invention offers a solution to the problem of giving a network operator incitement for attracting traffic to his network and the solution is independent of any networking technology, be it IP, Ethernet, ATM or other, used internally in the network. The solution does not require the network to be IP based. The only requirement is that the network can forward packets which carry information in their payloads. For example, using the present invention a network operator may implement IP version 6 protocol (IPv6) in his existing network and another operator can use IP version 4 protocol (IPv4) in his network; using the present invention an end-to-end path can traverse the two despite the different technology generations that are used. Using the present invention it is even possible for an operator that has several networks, some of which use different networking technologies, to route traffic between these.

The present invention provides a solution to the problem of a restricted amount of IP addresses and to the problem of mixing IPv4 and IPv6 networks along an end-to-end path in that an end-to-end path, when traversing an intermediary network, uses the local address of each network that is passed. This is true for all of the intermediary networks along the end-to-end path. With the present invention there is no "final" end-to-end destination address in packets that traverse the end-to-end path. Mixed IPv4 and IPv6 intermediate networks can be used along the end-to-end path. Further, an IPv4 based intermediary network can use all of the $2^{32}$ addresses that IPv4 provides; and these can be used locally within the intermediary network as local addresses.

The present invention offers a simple solution to the problem of continuous supervision of an end-to-end connection, in particular an IP connection, in order to verify that the quality of the delivered services. In accordance with the invention the end-to-end service node continuously supervises the service delivered by each intermediary network; if there is a difference between what is claimed and what is delivered, the end-to-end service node may shift the traffic to another intermediary network.

The present invention offer a solution to the overlay network problem discussed above in that an independent operator, or other interested party not operating a network, can connect a transit node to an existing intermediary network. Different independent operators or other parties, scattered around the world, can connect respective transit nodes to existing networks and have these existing networks interworking via transit nodes. In particular the independent operator need not be an operator of the network to which his transit node is connected.

The object of the present invention is to remove the above described drawbacks and problems with IP based internetworking using the methods and devices described in accompanying claims. This is achieved with the invention defined in claims 1, 17 and 20.

The invention comprises three types of service nodes; end-to-end service nodes, transit control nodes and transit nodes. A main task of an end-to-end service node is to provide an end-to-end connection over several intermediary networks by setting up legs of the respective end-to-end connections through intermediary networks. A main task of a transit control node is to manage link transit services between intermediary networks. A main task of a transit node is to handle traffic at one side of a link between intermediary networks.

The service nodes are organized in a hierarchical structure with transit nodes on the lowest level, transit control nodes on the level over the transit nodes and the end-to-end service nodes at the highest level. A characteristic feature of the invention is the manner in which the responsibility is distributed among the service node types. The end-to-end service node is the only node type that has knowledge of an individual end-to-end connection. For transit of a leg through an intermediary network it cooperates with transit control nodes and transit nodes. The transit control node has no knowledge of an individual end-to-end connection. An end-to-end service node gives it information for transit of a leg over a link. A transit node has no knowledge of an individual end-to-end connection. It keeps track of and marks connections and receives control information from an end-to-end service via a transit control node. By cooperation between transit nodes connected to an intermediary network a leg transit service through the network is provided under control from an end-to-end service node.

An operator of a transit node can attract customer traffic to his node and the network the node is connected to by offering better conditions than those other operators can offer, for example cheaper traffic charges; thus competing with other operators. A transit node can be multi-tenant in the sense that it serves many transit control nodes.

DESCRIPTION OF THE DRAWINGS

FIG. 1. is a schematic view illustrating an intermediary network, its connections to adjoining intermediary networks as well as means and functionalities for providing such connections, FIG. 2. is an overall schematic view of the system in accordance with the invention

PREFERRED EMBODIMENTS

General System Overview

Figure 3:
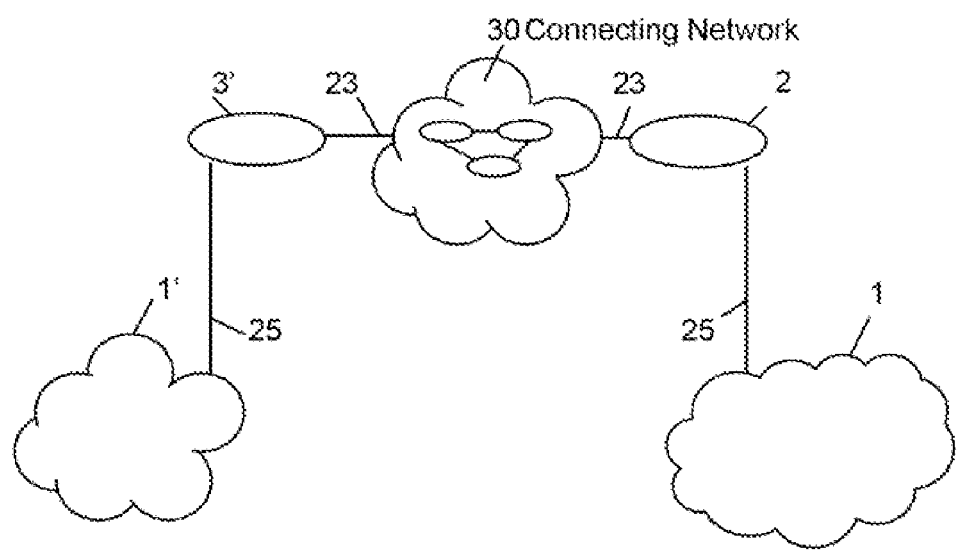
FIGS. 3-4 are schematic views illustrating various ways and means for connecting the intermediary network in FIG. 1 with an adjoining network, FIG. 5. is a schematic view illustrating the basic signalling process for setting up a connection in an intermediary network, and a general process for transporting the connection over an inter-network connection, FIG. 6. illustrates an end-to-end path between two hosts in the system shown in FIG. 2, FIG. 7. is a view of a packet, FIG. 8. is a view of a packet formatted in accordance with the specific requirements of a local intermediary network and having embedded therein a packet of a different format, FIG. 9. is a schematic view of two multi-tenant transit nodes, each serving many transit control nodes that have booked connections at the respective transit nodes, FIG. 10. is a schematic view of a multi tenant arrival transit node serving many departure transit nodes, FIG. 11. is a schematic view of a multi-tenant departure transit node connected to many intermediary networks and providing connections between these, FIG. 12. illustrates transit tag lists to which various service classes are associated, and FIG. 13. illustrates two systems in accordance with the invention allowing for transit of a connection from one system to another.

With reference to FIG. 1 the terminology used in the present invention is described. A leg of an end-to-end path is transited through an intermediary network 1 between transit nodes 2 and 3. Traffic to the intermediary network arrives over an incoming link 4 and departs over an outgoing link 5.

Transit node 2 is therefore called an incoming transit node and transit node 3 is called an outgoing transit node. Both transit nodes are connected to the intermediary network. The incoming link transports a bundle of incoming connections and is connected to the incoming transit node. The outgoing link transports another bundle of outgoing connections and is connected to the outgoing transit node. Each transit node has an inward portion 6 and 7 respectively towards the intermediary network and an outward portion 8 and 9 respectively towards the incoming and outgoing links respectively. The incoming transit node has an incoming interface 10 and the outgoing transit node an outgoing interface 11. To handle an incoming connection the inward portion 6 of the incoming transit node uses departure functionality 12 and to handle an outgoing connection the outgoing transit node, the receiver of the incoming connection, uses arrival functionality 13 located in its inward portion. For this reason the incoming transit node may also be referred to as a departure node and the outgoing transit node may be referred to as an arrival node. This terminology is preferably used when the connection is seen in a perspective from the inside of the intermediary network, while when seen from the outside of the intermediary network the terms incoming and outgoing transit nodes preferably are used. In FIG. 1 intermediary network 1 is connected to a previous intermediary network with link 4 and to a subsequent intermediary network with link 5. The leg of a below studied end-to-end path in intermediary network 1 is shown at 14 and extends between the incoming and outgoing transit nodes.

Reference is made to FIG. 2 which illustrates a general overview of the invention. Nodes at various layers are arranged in a hierarchical structure and are symbolically shown with rings. There is a plurality of intermediary networks at a network layer 15, another plurality of incoming and outgoing transit nodes at a transit node layer 16, a number of transit control nodes at transit control node layer 17, and finally a small number of end-to-end service nodes at an end-to-end service node layer 18.

In the example shown in FIG. 2 there are three intermediary networks 1', 1, 1", two outgoing transit nodes 3',3, two incoming transit nodes 2, 2", two transit control nodes 19, 20, one end-to-end service node 21 and one data base 22. In the specific embodiment shown the intermediary networks are interconnected at the transit node layer. In particular the incoming and outgoing transit nodes 3', 2 are connected with a link 23 and incoming and outgoing transit nodes 2", 3 are interconnected with a link 24. Transit nodes 3', 2 have no direct connection to transit nodes 3, 2".

Generally seen intermediary networks, transit nodes, transit control nodes and end-to-end service nodes need not be interconnected at their respective layers, although they may be so.

A node at the network layer typically comprises a switch or a router. Switches and routers are entities inside intermediary networks and they are not within the scope of this invention. Intermediary networks are typically managed by networks operators while transit nodes, transit control nodes and end-to-end service nodes are typically managed by operators independent of the network operators and independent of one other.

The transit nodes 3', 2, 3 and 2" are each connected to a respective node in the intermediary networks 1', 1 and 1" via links or direct connections (lines), collectively shown at 25 and 26 respectively. It is thus possible to connect host A in intermediary network 1' with host B in intermediary network 1" using the transit nodes and their links or connections 23-26. It will thus be possible to set up an end-to-end connection between A and B by selecting suitable intermediary networks. The end-to-end connection will thus comprise a leg 14' in intermediary network 1', leg 14 in network 14 and a leg 14" in network 1". It should be understood that there are many more intermediary networks, transit nodes, transit control nodes and end-to-end service nodes than those shown in FIG. 2. Generally it is a single end-to-end service node that in response to a connection request from A, decides the end-to-end path to be taken between A and B. In other words it is an end-to-end service node that selects the intermediary networks to be traversed by the end-to-end path; this selection being made among all of the shown and non-shown intermediary networks. Each selected intermediary network will thus transport its respective leg of the end-to-end path.

Transit control node 19 controls transit nodes 3' and 2 and can signal to these over signalling links 27. Transit control node 20 controls transit nodes 3 and 2" and can signal to these over signalling links 28.

End-to-end service node 21 controls transit control nodes 19 and 20 and can signal to these over signalling links 29. The signalling links between transit nodes, transit control nodes and end-to-end service nodes constitute a signalling network used to control the set-up and termination of connections for user data. This signalling network can be implemented in many different ways such as by dedicated links or by a dedicated signalling network analogous to the #7 telephony signalling network. The signalling can be carried over dedicated resources belonging to the same networks that are carrying user data and the allocation of dedicated resources may be done by management systems or automatically by self-configuration. The implementation of the signalling network is outside the scope of this invention. The signalling network is just a prerequisite for the interactions between transit nodes and transit control nodes that are a part of this invention.

Transit control nodes 19, 20 coordinate and control activities performed by the outgoing and incoming transit nodes 3' and 2 as well as activities performed by outgoing and incoming transit nodes 3 and 2". The end-to-end path is controlled by the end-to-end service node 21 that selects and supervises the intermediary networks the end-to-end path shall traverse. The end-to-end service node makes use the data base 22 that contains information on the intermediary networks, their individual performance with respect to properties specifications such as QoS, jitter, delay, synchronization, available bandwidth(s), connection qualities, and connection costs. The end-to-end service node interacts with transit control nodes 19, 20 in order to transit leg 14 through intermediary network 1.

The invention relates to packet switched networks. When reference in this description is made to an end-to-end path and to control of an end-to-end path it should be understood that the path comprises a series of networks between two communicating hosts. Within an intermediary network it is not possible to control the route along which packets travel from an incoming node to an outgoing node, because a route is determined by the routing schemes used locally in the network. Likewise, when reference is made to a connection it should be understood that a connection relates to a flow of packets between an incoming node to an outgoing node in a network. As is well known in the art packets belonging to one and the same packet flow may follow different routes within the network.

It is also possible to connect two intermediary networks, not with links or direct connections as in FIG. 2, but with a connecting network 30 as shown in FIG. 3. The connecting network is in this case not controlled by a transit control node but serves as a switch, which forwards the connection from an incoming destination address to an outgoing destination address in network 30.

Figure 4:
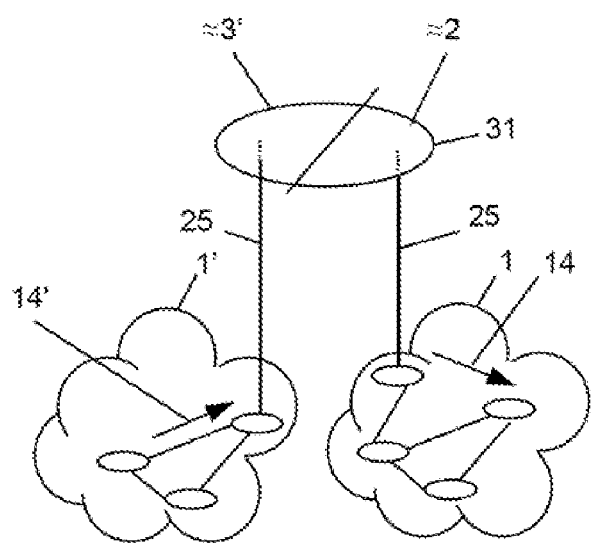

Still another possibility is to connect two intermediary networks is shown in FIG. 4. An outgoing transit node 3' is connected to an incoming transit node 2 in a so called a consolidated node 31 that houses the two transit nodes. Typically the two nodes are interconnected with a link on a backplane.

An intermediary network may have several incoming and outgoing transit nodes.

Transit nodes connect to existing networks and provide services to and communicate with transit control nodes. A main task of transit nodes is to "sell" as much transit traffic as possible through the networks they are connected to. Transit nodes have local addresses in the networks to which they are connected. Transit nodes provide means for identifying packets belonging to separate packet flows and handle transit of individual packet flows from their respective incoming link and to their appropriate outgoing link. The end-to-end service node sends connection set up requests via a transit control node to a transit node. To meet a connection set up request a transit node applies a transit tag process and, depending on the implementation, a link tag process. Transit tags are references which are used for many purposes described below. Primarily transit tags are used for identification of individual flows of packets related to a leg of an individual end-to-end path. It is important to note that a transit tag or link tag does not identify the ultimate source and ultimate destination of an end-to-end connection, that is host A and B are never identified. Transit and link tags can also be used for various security purposes, for admission control of traffic and for accounting of traffic. A transit tag is locally defined and can be a number, a letter, a sign, a mark and or combinations thereof. A transit tag is attached to transited packets. A transit tag is associated with a connection (packet flow). Each transit node manages sets of locally valid tags and their relations to tags which are handled by neighbouring transit nodes. The tags are used for transiting individual flows of packets over transit legs through the intermediary networks to which the transit nodes are connected. A transit node differs from a conventional router in that it neither uses a conventional routing protocol nor conventional forwarding tables. The forwarding actions performed by transit nodes are based on locally allocated packet identifiers not on network addresses. A transit node does not comprise addresses of items connected to its respective intermediary network or items that can be addressed from its respective intermediary network; a transit node cannot address such items. A transit node may be multi-tenant in the sense that it can provide transit services to several transit control nodes. A transit node may also have means for protocol conversion.

Transit control nodes are responsible for forwarding of packet flows over a link. Transit control nodes interact with transit nodes that are associated with a link between networks and book or 'buy' bandwidth therein for individual packet flows or aggregates of packet flows. Transit control nodes operate in a manner to be described below and have knowledge of the points at which it possible for connections to enter and exit intermediary networks. Transit control nodes have knowledge of a connection in an individual link they control, but they have no knowledge of a connection in link that they do not control. Transit control nodes don't carry any traffic.

End-to-end service nodes have knowledge of all possible intermediary networks, transit control nodes, transit nodes, links and possible connections between intermediary networks. End-to-end service nodes have functionality for selecting end-to-end paths via any set of possible intermediary networks. An end-to-end service node has knowledge of an incoming transit node to an intermediary network and an outgoing transit node from the same intermediary network and administers said nodes to prepare for transit and to execute transit of a leg across said network. An end-to-end service node has also knowledge of the outgoing transit node from one intermediary network and the incoming transit node of the next intermediary network as well as of a link between said nodes and administers said nodes to prepare for and to perform transit of a leg over the link between the intermediary networks. An end-to-end service node has full knowledge of the end-to-end connection it administrates. In particular it has knowledge of each individual leg in each individual intermediary network and the links the end-to-end connection traverses.

Via control signalling links the end-to-end service node receives a request for an end-to-end connection from a host and selects intermediary networks for the requested connection based on the properties that are demanded in the request. It selects transit control nodes according to the selected intermediary network and orders the selected transit control nodes to prepare for legs through the selected intermediary networks. The end-to-end transit control service node makes use of the database that has gathered and stored detailed information on the services offered by the intermediary networks. This knowledge comprises information such as, which the networks are, the organization operating them, the geographical extension they have, the characteristics they have, such as the services they provide and the guarantee, if any, by which an offered service is executed, the transmission technology used, the round trip delays, the bit error rates, the QoS provided, the traffic taxes etc. This knowledge is contained in the data base with which the end-to-end service node co-operates. The manner in which this information is obtained is no part of the present invention.

Connection Set Up

Figure 5:
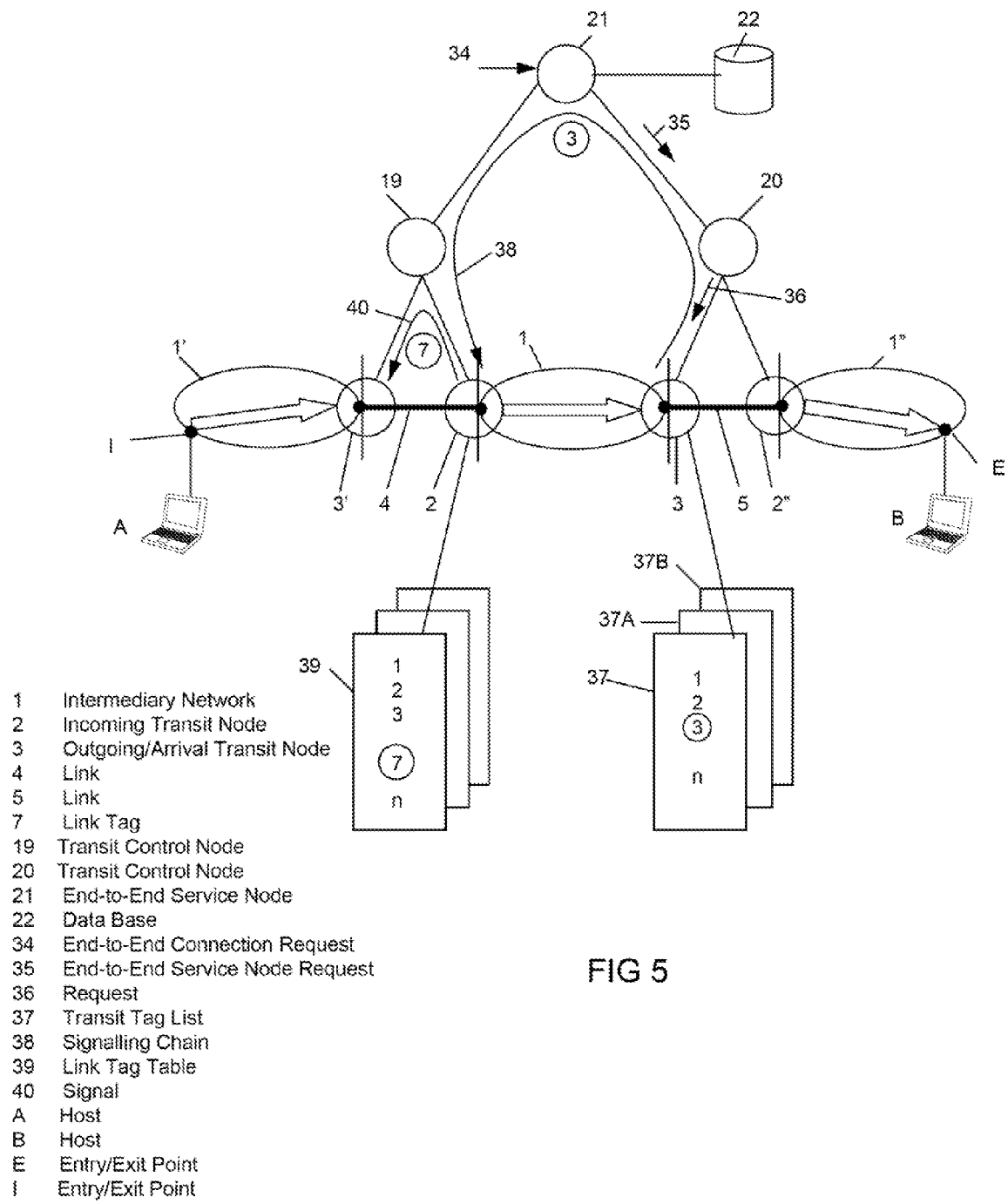

Refer to FIG. 5. Arrow 34 represents a connection request sent from host A, said request ordering the establishment of an end-to-end path from host A to host B and specifying the communication parameters that the end-to-end connection should fulfil. Dot I in network 1' and dot E in network 1" represent the entry and exit points respectively for the end-to-end service. The request is communicated to the end-to-end service node via any suitable means, e.g. via the links, networks or lines shown or via a separate signalling network. The request starts a session comprising several processes among which one is to analyze the request in order to select potential intermediary networks, recorded in the data base 22, to be used for establishing the requested end-to-end path and to analyze if these fulfil the requirements set in the request. Another process is to negotiate with potential providers of transit control services (transit control nodes) to settle the conditions for the leg traversing the respective intermediary network, such as the stability required for connection, priority to be assigned to the connection, bandwidth, latency, QoS, prize price, etc. Next the final intermediary networks are selected. Another process is to select transit control nodes for each leg of the end-to-end path and to order the selected transit control nodes to establish a connection in each of the respective intermediary networks. The transit control nodes in their turn initiate processes to order the involved transit nodes to prepare for subsequent information transfers by setting up data about how tags are ** o be treated, how packets shall be adapted for transit over the intermediary network etc. Still another process is to have the selected transit control nodes to order its respective transit nodes to establish the connection over which a leg is transported.

Next a path set up mechanism will be described that synchronizes the behaviour of the incoming and outgoing transit nodes of an intermediary network. The mechanism is controlled by transit control nodes that communicate appropriate information to the respective incoming and outgoing transit node to make it possible for them to act in a coordinated way on specific individual data flows. The mechanism for how traffic is transited through intermediary network 1 will be described in two phases. The first phase is about how a path is set up. The second phase is about how packets are transferred after a path has been set up.

Path Set Up

1. The end-to-end service node 21 receives a request for an end-to-end connection, arrow 34. The connection shall fulfil certain quality demands.
2. The end-to-end service node consults its data base 22 and selects intermediary networks and links interconnecting the networks. In the example described intermediary networks 1', 1, 1" and links 4, 5 are selected.
3. The end-to-end service node finds out the transit control nodes it must cooperate with in order to forward the leg through the selected networks. In this case it finds it must cooperate with transit control nodes 19 and 20 in order to get appropriate capacity. The end-to-end service node assigns the end-to-end connection, i.e. the packet flow, an identity X representative of the "buying" host A. The end-to-end service node stores the following information in a table, Table 1 below:

TABLE 1

| PACKET FLOW | INTERMEDIARY NETWORK | LINK | TRANSIT CONTROL NODE |
|---|---|---|---|
| X | 1' | 4 | 19 |
| X | 1 | 5 | 20 |

4. The end-to-end service node requests, arrow 35, transit control node 20 for a transit tag to be used for transit through intermediary network 1. A transit tag is used as a local identifier (flow identifier).
5. Transit control node 20 forwards the request to the outgoing transit node 3, arrow 36. In this case the outgoing transit node 3 selects transit tag 3 from its transit tag list 37, marks the selected tag as occupied in its list, and returns the transit tag plus its own local address (=the address of the outgoing transit node) in intermediary network 1 to the transit control node 20. The outgoing transit node will also mark its list with information on the identity of the buyer of the connection and will use the transit tag and "buyer" information for accounting purposes and also for admission control as will be described later. The transit control node 20 returns the selected transit tag and the local address to the end-to-end service node 21 which in its turn forwards this information to the transit control node 19 serving the incoming transit node 2, this transit control node 19 in its turn forwarding this information to the incoming transit node 2. This signalling chain from outgoing transit node 3 to incoming transit node 2 is illustrated with the bent arrow 38. The departure functionality in departure transit node 2 analyses all incoming packets with regard to the presence of a transit tag. Packets provided with a transit tag will be processed in a special manner described below, while those which don't have a transit tag will be processed conventionally. In this manner packet flows belonging to an end-to-end connection will be discriminated from other packet flows. The departure functionality also sends the specially treated packet flow into the intermediary network 1 and marks the destination of the packets with the local address of the arrival transit node 3, which was signalled according to arrow 38. Within the intermediary network 1 the packets of the packet flow will be routed as conventional packets using the local routing mechanism of network 1 until they arrive at arrival transit node 3. Arrival functionality therein will analyse the incoming packets with regard to the presence of a transit tag and subject packets marked with transit tags a special treatment described below. Packets marked with transit tags will be sent further towards the next intermediary network 1". If the node 3' is the first node in the chain of links and legs, as in the example illustrated in FIG. 5, then this node must also map the identity of the packet flow on a link tag, as is described in the next section.
6. Following a similar scheme, but now implemented for transit of a connection transit over a link, the end-to-end service node has ordered the transit control node 19 to transport the flow from host A over link 4 to the incoming transit node 2. In response the transit control node 19 requests a link tag from incoming transit node 2; said link tag being used for identification of the packet flow from A over the link 4. The incoming transit node 2 selects the link tag from its link tag table 39. In the example link tag 7 is selected and is signalled to incoming transit node 3' as indicated by the small bent arrow 40. The transit control node 19 will comprise the following table:

TABLE 2

| LINK ID | LINK TAG | TRANSIT TAG | ADDRESS OF ARRIVAL TRANSIT NODE |
|---|---|---|---|
| 4 | 7 | 3 | 123.456 (=node 3) |
| — | — | — | — |

7. The incoming transit node 2 will thus comprise the following information in a table:

TABLE 3

| LINK TAG | TO BE REPLACED WITH TRANSIT TAG | USING THE LOCAL ADDRESS |
|---|---|---|
| 7 | 3 | 123.456 (=node 3) |

This completes the set up phase of the leg that should be transited through intermediary network 1. Similar set up procedures are taking place for each of the networks through which the end-to-end connection shall pass and similar tables are present at the various nodes.

It should be noted that neither the transit control nodes nor the transit nodes have any information on the identity X of the end-to-end connection discussed above. Packets associated with the connection identity X do not contain any information on the X marked end-to-end connection. This information is only with the end-to-end service node. Packets associated with end-to-end connection have instead local references in the form of transit tags and link tags.

As shown in FIG. 5 a transit node may comprise several tag tables 37, 37A and 37B. In the example shown there is one list for each class of service a connection may have. In the alternative the node may comprise a list of tags wherein each tag is associated with a set of properties and these properties are represented by different link tag attributes. The quality class is given in the connection request or is given by the end-to-end service node. The above signalling scheme does not indicate how the class of services are signalled to the transit node but if one and the same transit node can provide different classes of service each request will have to contain information about which class of service that is demanded. This information should be sent from the transit control node to the transit node. It is up to the transit nodes to implement the conversions necessary for realising the demanded class of service. It is contemplated that information on the quality class is included in the signalling information.

Networks 1' and 1" hold an exceptional position. Host A negotiates with end-to-end service node 21 on an end-to-end connection to host B. After selection of end-to-end path, intermediary networks and links, the end-to-end service node signals to the outgoing transit node 3' and to the incoming transit node 2". The outgoing transit node 3' is ordered to identify the packet flow from A and to treat them in the following manner; incoming packets having A's address, and possibly also a specific port number, should be mapped on a link tag, in this case link tag 7. The incoming transit node 2" is ordered to treat packets in a reversed fashion; incoming packets marked with a specific link tag, in this case the link tag taken out at this incoming transit node 2" for transport of the end-to-end connection from transit node 3 to transit node 2" over link 5, should be mapped on B's address, and possibly also on a port number at B.

Packet Transiting

Once the set up phase is completed the end-to-end service node signals to the sending host A that the end-to-end path is ready for transmission. In response to this message the sending host can start transmitting its packets and at each departure and arrival transit node the actions described below will take place.

Transit through intermediary network 1 will be described only. Transits through the other intermediary networks take place in similar fashion. The incoming transit node 2:

1. Examines the packets in all incoming traffic in order to determine if they carry a link tag. Packets not compliant with the link tag mechanism will not be forwarded via end-to-end connections. They may for example be forwarded on a best effort basis if spare capacity is available and may be dropped if capacity is scarce.
2. If the packets carry a link tag, the departure functionality reads the link tag and uses it as index to table 3 to verify with which end-to-end connection the packet is associated. If the link tag is present under heading LINK TAG the end-to-end connection with which it is associated can be verified. In this case link tag 7 is read from the packet and link tag 7 is also found in column LINK TAG IN.
3. The departure functionality substitutes the link tag for the transit tag to be used in intermediary network 1. The transit tag is read at the corresponding index in Table 3 under the header TO BE REPLACED WITH TRANSIT TAG. In this case link tag 7 will be replaced with the transit tag 3.
4. The packets are provided with a new destination address, in this case the local address of the arrival transit node 3, in this case 123.456. The packet received at the incoming transit node is embedded in the packet format used by intermediate network 1.
5. The packets reach the inward portion of the outgoing node 3.
6. This completes the transit of the leg through intermediary network 1. The described link tag and transit tag procedures are repeated for each leg until the last network is reached where the inward portion of the corresponding transit node marks the packets with the local address of host B
7. When A and B end their communication session, the end-to-end connection is deactivated (torn down), the corresponding entries in the various tables are erased and the transit tags used in the transit nodes are marked as free.

Figure 6:
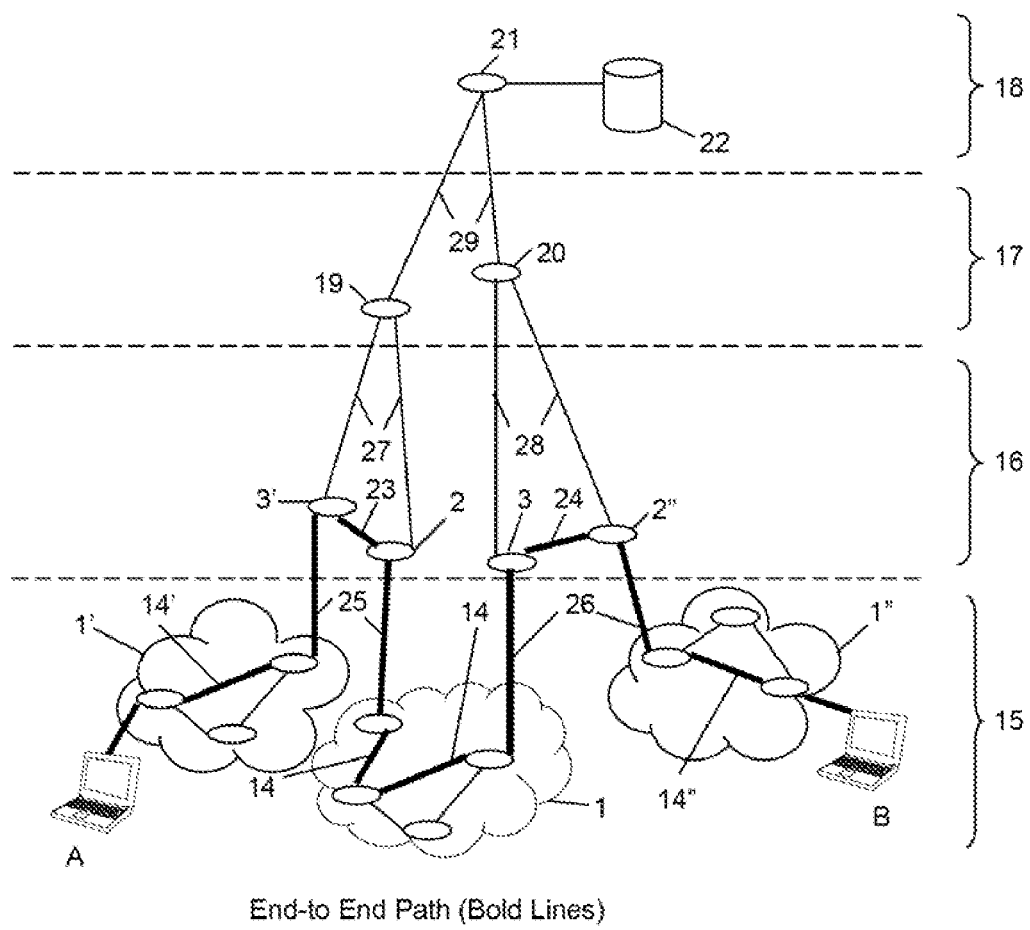

Having described a situation in which there are direct links between the intermediary networks the man skilled in the art may readily apply the transit and link tag processes to the situation in FIG. 2 where the intermediary networks have no direct interconnection on network layer 15, but are interconnected via the transit nodes at transit node layer 16. The resulting end-to-end path is indicated with bold lines in FIG. 6.

If two adjoining intermediary networks use different protocols on some or all levels the arrival transit node will have to provide protocol conversion on these levels.

Figure 7:
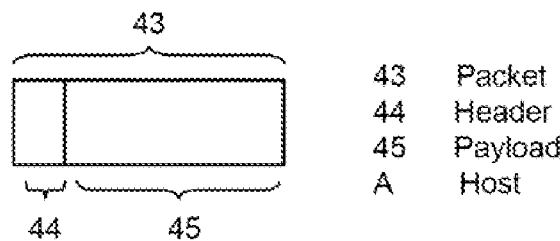

In FIG. 7 a packet 43 transmitted from host A is shown to comprise a header 44 and a pay load 45. This is the general format the packet has when traversing intermediary network 1'.

Figure 8:
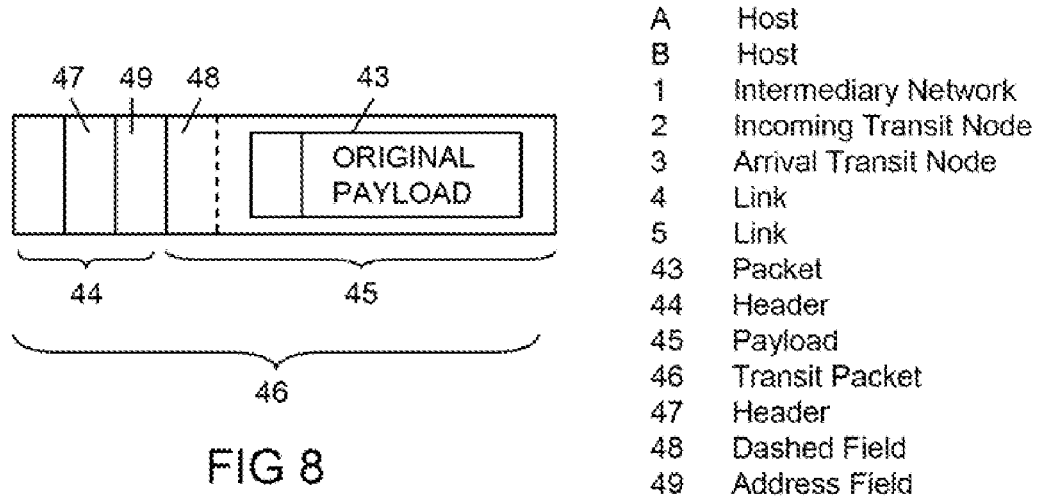

Refer to FIG. 8. When a packet 43 of the general format shown in FIG. 7 arrives to the incoming transit node 2 in the intermediary network 1 its payload is extracted and inserted into a new packet 46, called a transit packet for pure linguistic reasons, which also has a header 44 and a payload 45 and which has a format dictated by the transmission technology used in intermediary network 1. The incoming transit node has means for inserting the address of outgoing (arrival) transit node (123.456) in a destination address field in the header of the transit packet. If the header has a field 47 "for future use", i.e. a field not specified by the standard, then the transit tag or link tag may be inserted therein. If no such field or any similar field in the header is available, then the transit tag is inserted into the payload, as is indicated by the dashed field 48. The transit packet will thus be routed through the intermediary network in the same manner as any other packet is routed in intermediary network 1. In a source address field 49 the sender of the packet is inserted. In the general case a valid address in the intermediary network is inserted as sender. At said valid address there may be an entity for forwarding the error messages to another node, for example a transit control node or an end-to-end service node. Any transit nodes may be indicated as sender. It is also possible to give another network address and provide said address with a pointer to a transit control node. As a consequence, an error message generated within any of the networks 1', 1, 1" or on any of the links 4 or 5 is reported to a node that in its turn may report the error back to the end-to-end service node, where actions may be taken e.g. to select other links and/or intermediary networks for the flow X. The payload of the packet in the transit packet 46 comprises the original information transmitted from host A. As will be described further down, the header attached to the payload of the packet embedded in the transit packet does not comprise any address information on the ultimate sending and receiving hosts A and B.

Any method can be devised for implementing the transit packet format, the only requirements are that it is supported by both the departure node and the arrival node when transiting through an intermediary network and that it does not interfere with the routing inside the intermediary network.

Within an intermediary network the packets use the local address of the arrival transit node 3 as destination address. Routers in the intermediary network will thus route the formatted packet as any normal packets. Therefore no unauthorized or illegitimate entities, not even the intermediary network itself, will be aware of the fact that the intermediary network transports packets which belong to an end-to-end path. For the same reason will neither the original source nor the final destination of the end-to-end path be known to any unauthorized or illegitimate entities, not even to the intermediary network itself. From an intermediary network's point of view a normal transport of packets from one local node to another takes place in the intermediary network.

Only the end-to-end service node knows about the real source and the real destination in the end-to-end connection.

Figure 9:
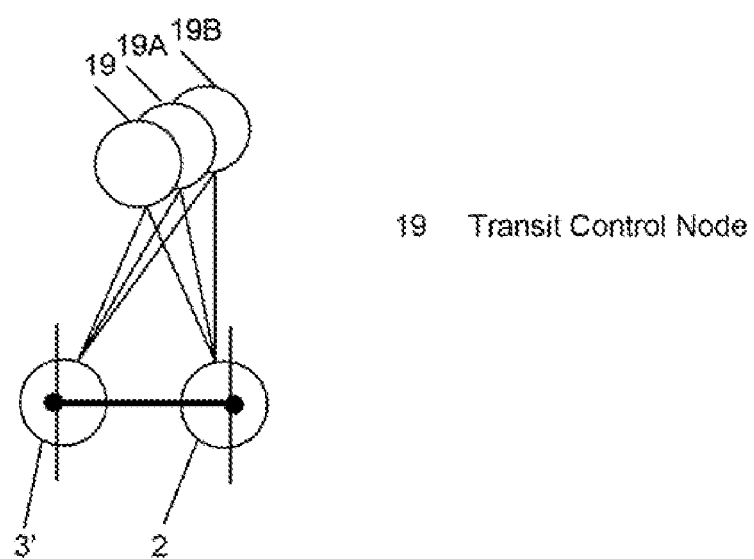

As shown in FIG. 9 a transit node may be multi-tenant in the sense that the inter-network connection service may be operated by different operators, each one owning a respective transit control node. In the example shown there is three operators each one having a respective transit control node 19, 19A and 19B. Each operator has thus acquired a respective part of the bandwidth of the inter-network connection. For example the link 4 is shared among the three operators.

Figure 10:
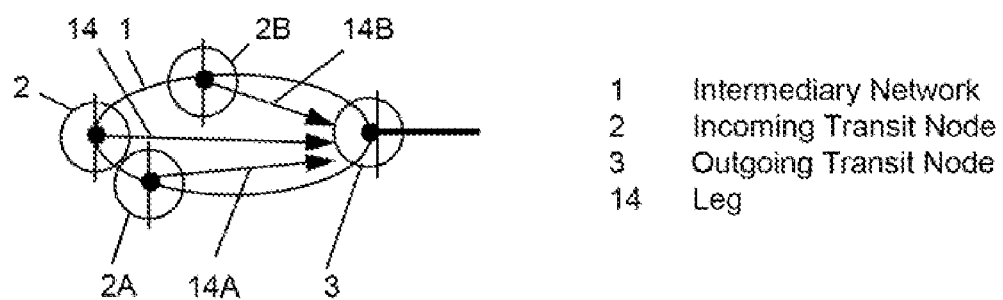

As shown in FIG. 10 an outgoing transit node 3 may receive several packet flows, each one belonging to a respective leg; each leg will thus belong to a respective end-to-end connection 14, 14A and 14B. As noted above there may be several incoming transit nodes connected to a common intermediary network and each such node may comprise end-to-end traffic that should exit an intermediary network at a common departure transit node. Three such incoming transit nodes 2, 2A and 2B are shown and each node has a respective leg 14, 14A, 14B that use the same outgoing transit node 3 from intermediary network 1. If the outgoing transit node receives several legs from different sources the outgoing transit node will make use of the link tag process described above and assign each leg a respective link tag. If the incoming transit nodes 2, 2A, 2B are owned or operated by different operators the outgoing transit node 3 is said to be multi-tenant.

Figure 11:
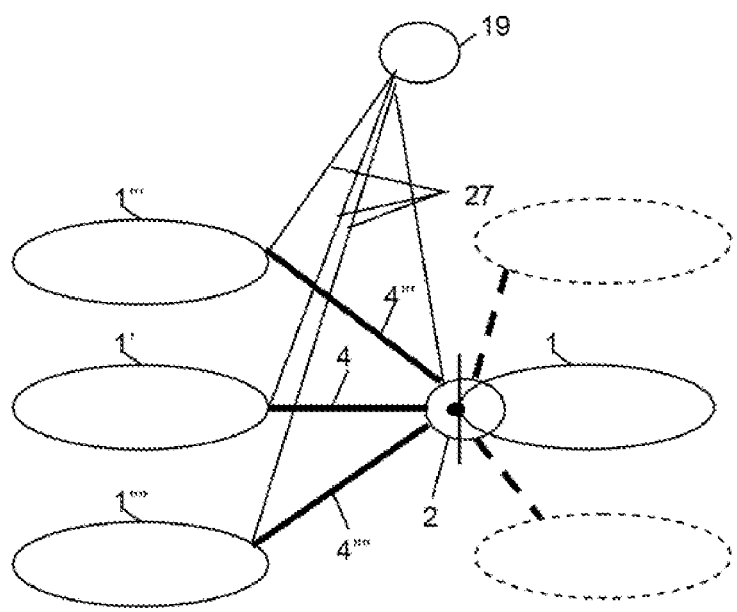

As shown in FIG. 11 a transit node may also be multi-tenant in the sense that it can be connected to several networks and offer transit control nodes traffic in several networks. In the example shown the outward portion of incoming transit node 2 is connected to three independent intermediary networks 1, 1', 1''' and 1'''' which may be operated by different operators. The transit node can offer its transit control node 19 traffic between any of networks to which it is connected, for example traffic between 1''' and 1. In a similar manner as the inward portion of the transit node is connected to several networks, its outward portion can also be connected to several networks, as indicated with the dashed lines, and pass traffic between any of the networks at its inward portion to any of the networks connected to its outward portion.

Travel Agency Metaphor

The host that requests an end-to-end connection is like a customer who visits a travel agency (the end-to-end service) and ask them to arrange with a flight to a specified destination (from A to B). The travel agency has knowledge about possible air carriers (intermediary networks) and their current offers (QoS). The travel agent selects carriers for transportation of the passenger from air port (departure transit node) to air port (arrival transit node) along the way to the destination. Next the travel agent books the various flights at various booking services (transit control nodes) which handle tickets (transit tags). This is the set up phase of the journey.

The actual physical transport is done by the individual carriers (airline companies). At an intermediary air port the old ticket is changed for a new ticket to be used for the next leg of the journey. This is the transit phase of the journey.

Several booking services (transit control nodes) may serve one and the same carrier. An transit node may offer its services to several booking services which thus will compete on the transportation of passengers between specified destinations. Travel agencies may specialize and have different competences.

Caching of Tags and Pre-Reservation

Since tags can regarded as permits that allow for a specific treatment of individual packets and since tags do not carry any information about the specific users (source/destination-pairs) they are anonymous in relation to networks and links that they pass. This means that caching can be applied by transit control nodes and end-to-end service nodes. In particular transit control nodes and end-to-end service nodes can dispose over pools of transit tags which they book at transit nodes. From these pools they allocate tags for the traffic that they control. Used tags, that is tags which are released when end-to-end connections are released, are put back to the pool and can subsequently be allocated to other users. The number of tags can be dimensioned to allow for caching and for preparation of connection legs to be activated later. Traffic related accounting is applied only for connections that are active and in relation to the traffic that is carried.

A tag pool may comprise more tags than the number of connections the tag user by agreement with the transit service provider is allowed to transit. The tag user is responsible for not assigning more tags, i.e. more traffic, than agreed upon. The transit service provider monitors traffic in order to verify that the agreed traffic volume is not exceeded.

As an example, say that a transit control node operator negotiates with a transit node operator and books 100 connections through the intermediary network and is allowed to have 150 transit tags in a pool for assignment to connections. The end-to-end service books connections at the transit control node and plans the traffic to the transit node. The transit control node supervises and control that no more than 100 connections are activated. In other words the transit control node checks that no more than 100 connections are used simultaneously. In this manner the transit control node makes efficient use of the 100 connections it booked. If more than 100 connections are simultaneously used, the transit node will report this back to the end-to-end service node and may block overflow traffic. A transit node inspects the tags adhering to the packets of all incoming traffic, can see the entity that booked them and can therefore also count the number of connections a specific entity is using. A transit node may thus supervise an end-to-end service node.

Transit tags can be equated with flight tickets mediated by an air line that makes use of the "over-booking" system.

Connectivity and Quality Supervision.

In conventional IP based networks the packets of an end-to-end path are marked with the address of the originating host, host A, as source address. There are also means that can perform reporting of connectivity errors back to the originating source. The knowledge about connectivity errors will then end up in individual nodes/networks and thus not be available for collective benefit. The source host has to take necessary measures by itself. In accordance with this invention the incoming (=departure) transit node inserts into the source address field 49 not its own address, but a local address associated with the transit control node 19. This will ensure that the transit control node can receive error messages containing information on connectivity quality errors in the corresponding intermediary network. The transit control node will thus be in a position to take appropriate actions, such as for example report the error back to the end-to-end service node so that the end-to-end service node can update its data database regarding connectivity and quality properties. The end-to-end service node can then take appropriate actions, such as for example redirect the end-to-end path and negotiate with the operator of the failing network etc. Using this process the availability and quality of the end-to-end path can be monitored continuously. The competitiveness of an end-to-end service will depend on the quality of the data in the database 22 and how well data is used for deciding on end-to-end routes.

It should be noted that the local address associated with the transit control node 19 may physically lead to a forwarding node that has responsibility to forward the relevant information to the transit control node. This forwarding functionality may reside in the transit nodes or alternatively be implemented in separate physical nodes connected to the intermediary network. The association implies that the captured information shall be forwarded to the transit control node in question based on the address.

Packet loss and packet loss frequency can be detected by marking the packets with sequence numbers at the departure transit node. At the arrival transit node the sequence numbers of the arriving packets are then checked. If a sequence number is missing, then an error has taken place and a notification of the fault can be sent to the transit control node that in turn may report to the end-to-end service node.

By providing the packets with time stamps at the departure transit node transmission delay or jitter through a network can be measured to supervise that the intermediary network delivers according to agreements. At the arrival transit node the arrival time is read and compared with the time stamp. If the transit time through the network exceeds a given threshold then an error has taken place and a notification is sent to the transit control node.

The frequency with which notifications are sent can be configured dependent on the application.

The end-to-end service node instructs the departure and arrival transit nodes what kind of supervision shall take place, what thresholds should be applied, and for which packets flow or flows it should be applied. The information is forwarded to the transit nodes via the corresponding transit control nodes. The outgoing transit node may also notify the transit control node of the number of packets that have traversed the intermediary network without errors. Timestamps, sequence numbers and other information needed for supervision is added to the transit payload in a way that is mutually valid for the departure transit node and the arrival transit node and does thus not affect the intermediary network.

If limits or thresholds are exceeded in an intermediary network, this does not necessarily mean that the end-to-end performance is out of limits. The supervision of intermediary networks is primarily about building information about the performance of alternative available networks. The frequency of error notifications from intermediary networks may thus be reduced by aggregation and filtering of notifications before propagating the information.

The arrival transit node can keep track of the number of bits and packets that pass, make the running tests against thresholds and take action only when a threshold is violated.

Service Differentiation and Accounting

Figure 12:
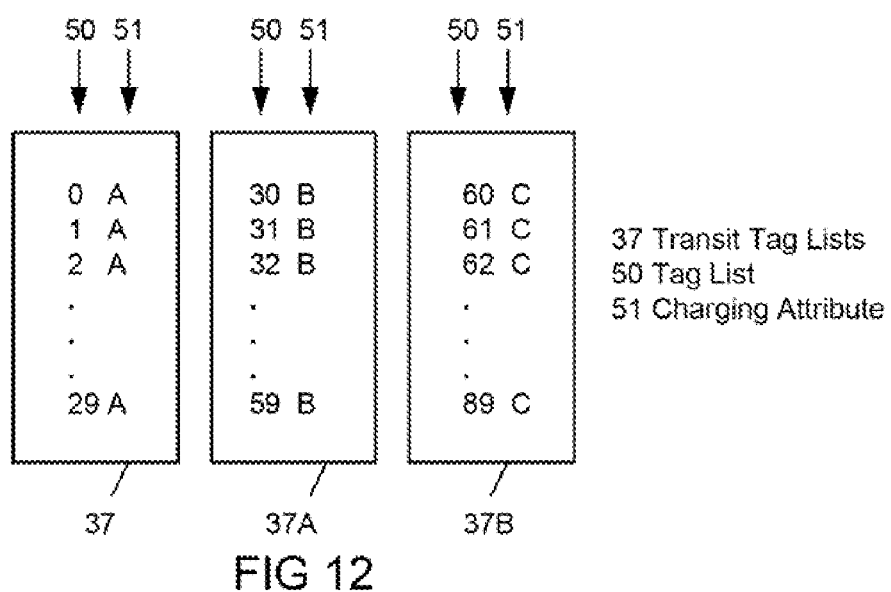

As illustrated in FIG. 5 the arrival transit node 3 has several classes of transit tags to be used for differentiating between transit services with different properties. This concept will be further evolved and reference is made to FIG. 12. Suppose the transit service cost is differentiated in the intermediary networks. In accordance with the invention each traffic class is assigned a respective charging attribute. FIG. 12 illustrates transit tag lists 37, 37A and 37B each one associated with a respective service class. In column 50 in each tag list the transit tags are indicated, in column 51 the charging attribute of the respective service class is indicated. For example charging attribute A refers to the cheapest service class, charging attribute C to the most expensive, and charging attribute B to a service class whose cost is between A and C. Next, suppose the tag lists of FIG. 12 replace the correspondingly denoted tag lists in FIG. 5. Also suppose the outgoing transit node 3 has received a connection set up request and service class request from the end-to-end service node. In response to this order and according to the invention the outgoing transit node 3 selects a transit tag and a charging attribute. The selected tag and charging attribute are signalled from the outgoing transit node 3 along arrow 38 to the end-to-end service node 21. After the set up phase has been completed and packets marked with the selected transit tag begin to arrive to the transit node 3, the transit node keeps a running count of the packets so marked and reports the number of counted packets to the end-to-end service node via the respective transit control nodes. The end-to-end service node will now have information on the identity of the connection, the identity of the intermediary network 1, the charging attribute for the connection and the amount of transited packets. Using this information the end-to-end service node is in a position to generate, for host A, accounting data pertaining to the connection through intermediary network 1. The accounting data is stored. Using the same procedures for each intermediary network involved in the end-to-end connection the end-to-end service node accumulates accounting data for host A. At a later instant the end-to-end service applies a charging tariff on the stored accumulated accounting data so as to charge host A for transit services.

Outgoing transit node 3 has knowledge about the costs for different types of traffic over link 5. Incoming transit node 2 has knowledge about the costs for different types of traffic through intermediary network 1. This information is stored in tables 37, 37A, 37 B and corresponding tables 39 respectively. Transit nodes 3 and 2 need not send this information to the end-to-end service node each time a new packet flow is transited, but instead they forward this information to a data base, for example data base 22, wherein it is stored. In this manner the end-to-end service node has up to date information on the costs for transiting a connection over the link and through the intermediary network respectively and can use information this when the end-to-end path is selected.

Instead of assigning one and the same charging attribute to a sequence of transit tags as shown in FIG. 12, a charging attribute selected among a set of charging attributes is assigned an individual transit tag.

Instead of or in complement to a charging attribute a transit tag can have other attributes assigned. For example admission and caching attributes may be used.

By keeping a part of its capacity aside relative to ordinary commitments the incoming transit node 2 can make use of dynamic pricing when the local traffic load is high and charge more for the connections by applying modified cost attributes to selected traffic classes. Node 2 signals a corresponding modified charging attribute to the end-to-end service node together with information on the transit tag used for the packet flow that makes use of this set aside traffic capacity. Dynamic pricing may also be applied by the transit node for traffic that exceeds agreed limits, for example in the above referenced case of over-booking when the end-to-end service node starts to more than the booked 100 connections.

End-to-End Anonymity Protection of Packets

In order to prevent malicious parties from getting access to the original source and the ultimate destination of an end-to-end path, i.e. the address of host A and B respectively, and tamper with the end-to-end connection the following procedure is devised:

When the originating source, host A, has got an end-to-end path from the end-to-end service node, host A may start to send packets along that path. Since forwarding along the path is done using local addresses and local transit tags there is no need to send the address of the original source, i.e. the local address of host A, in the packet headers, nor is it necessary to send the ultimate destination address of host B in the packet headers. In accordance with the invention the end-to-end service node transmits these parts of the packet headers to the end of the end-to-end path, i.e. to the incoming transit node in the last network of the end-to-end connection. In the example shown in FIG. 5 this node would be transit node 2". In FIG. 5 the distance between source and destination is short although one should bear in mind that there may be many more intermediary networks between networks 1' and 1". After reception of these items the incoming transit node 2" restores the packets to their correct format for use in network 1" with the ultimate destination address (address of host B) in the receiver address field of the header and with the address of host A in the origin address field of the header.

It should be noted that the networks to which A and B are connected need not use the same transmission technology or addressing scheme. For example A's network may be an IP based network, while B's network may be based on Ethernet technology, in which case B is addressed by its Ethernet address.

Split End-to-End Connections.

With split end-to-end connections we refer to a mechanism or process that splits an end-to-end connection in sections and uses a joining point at which the sections are joined together.

Packets belonging to an end-to-end path which traverses an intermediary network will be forwarded through the network using the local addresses of the network. The local address of the incoming transit node of the intermediary network is used as sender of the forwarded packets, while the local address of the outgoing transit node is used as destination.

As discussed above under the heading "Connectivity and quality supervision" it is also possible to associate the sender address with the node to which error reports are sent.

Figure 13:
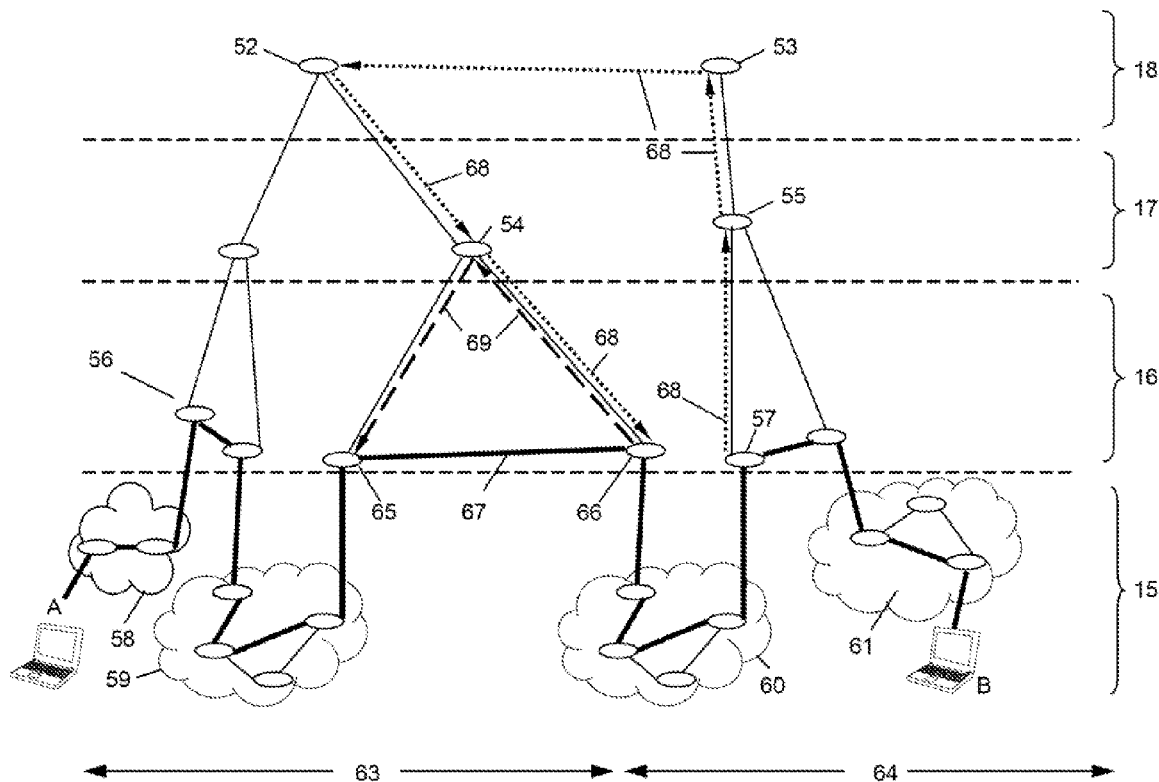

Refer to FIG. 13 which illustrates two end-to-end service nodes 52 and 53, a number of transit control nodes some of which are shown at 54 and 55, a number of transit nodes 56, 57, 65, 66, and a plurality of networks 58-61.

Transit node 65 is interconnected with transit node 66 over a link 67.

Host A has requested an end-to-end path to host B by sending an end-to-end request to end-to-end service node 52. The end-to-end service node 52 examines the request and can see, from tables not shown in the drawings, that host B is served by end-to-end service node 53. There are two possible joining points, either transit node 65 or transit node 66. The end-to-end service nodes negotiate and agree that transit node 66 be used as joining point. The end-to-end path will thus be divided into two sections, a first section shown at arrow 63 and a second section shown at arrow 64.

Following the set-up scheme described above there are now three activities that should take place. (1) The end-to-end services shall cooperate in order to transfer the connection from transit node 65 to transit node 66. (2) The end-to-end service 53, which is responsible for transit of connections over intermediary networks 60, 61, must transit the connection through network 60, in particular it should be transited from transit node 66 to transit node 57. (3) The end-to-end service 52 must arrange so that the connection be transferred from transit node 65 over the link 67 to transit node 66. These activities are coordinated in the following manner:

End-to-end service 53 orders set up of a connection from transit node 65 to transit node 57 and in response transit control node 55 takes out a transit tag at transit node 57. This transit tag is signalled to transit node 66 as is shown by dotted arrows 68. Transit control node 54 serves link 67 and receives an order from end-to-end service 52 to forward the connection over link 67. The connection is to be marked with a specified link tag. In response, transit control node 54 takes out a link tag at transit node 66 and signals it to transit node 65 at which the incoming packets are marked with the link tag as described in connection with FIG. 5. This is indicated by the broken arrows 69. The link tag taken out will be the specified link tag. End-to-end service 52 orders, via transit control node 54, transit node 66 to examine incoming packets and in those marked with the specified link tag to replace the link tag with the transit tag.

If transit node 65 would have been selected as joining point the same signalling principles would apply but signalling paths would be different. End-to-end service node 53 may in this case control transit control node 54 and the signalling would go in the reversed direction.

The true, local address of the sending host is only visible in the host network 58 and the true, local address of the receiving host is only visible in the host network 61. Traffic transited by intermediary networks cannot be associated with the hosts, only with the serving transit nodes.

Each end-to-end service node will thus be responsible for its section of the split connection and they cooperate in a natural manner in order to tie the connection sections together.

Ends Based Routing.

With ends based routing we refer to mechanism or process that uses an implementation of the split end-to-end connection mechanism in order to let user A and B to control a respective section of the split connection.

Traditionally sending information from a source to a destination is accomplished by the source which sends packets addressed to the destination. The interconnected networks route the packets from source to destination under network control. There are disadvantages with this since the destination can only reject traffic when packets arrive at the destination end. The network as such cannot identify adversely injected traffic that will not be accepted by the destination. Well-known problems are spamming, denial of service attacks etc. Further, the destination is not able to control the way packets are routed the last section of the end-to-end path. By ends based routing in accordance with the invention the end-to-end connection is split in a manner that gives the source entity control over the route that packets departing from there should take and the destination entity is given control over the section of the connection that should be used for delivering packets. To achieve this, the source and destination agree upon a joining transit node and a local tag at that node to be used for joining together the sections of an end-to-end connection. The negotiation is performed in a separate control signalling phase prior to connections for user data are being established. The source and destination parties then control the establishment of their respective section of the connection. Instead of using just one joining point it is possible to build an end-to-end connection from more than two sections or segments by introducing additional joining points. The originating and destinations hosts may control sections to separate joining points and the connection section between these two joining points may then be controlled separately by the originating host, the destination host or a service initiated by one of the hosts. This procedure may be iterated recursively to build a connection formed by several sections. The joining points may be used to connect or disconnect different types of resources to/from the connection between the communicating hosts. Examples of resources are storage devices, converters, recorders and other equipment.

Refer to FIG. 13 which illustrates the above. Hosts A and B have agreed that they shall communicate. How this is achieved is no part of the present invention. A and B decide that transit node 66 should join the first and second sections of the split end-to-end path. In order to receive a connection from A host B (1) decides on a joining point, (2) orders its end-to-end service node 53 to set up a connection from the joining point to B, and (3) communicates the joining point to host A. Following the above described split end-to-end mechanism the connection from A to B is finally set up.

The main idea behind the ends based routing mechanism is thus that no party that hasn't been given a joining point by B can send information to B. Unauthorized traffic to B will be rejected. This means that networks near host B will not be burdened with unauthorized traffic.

Handling of Mutual Connections Between Parties

On Internet the source address, indicating the sender of a packet, is used by the receiver to find out the address to which responses to the originating host should be sent. With the present invention information from one source to a destination and the associated information returned in the opposite direction are carried by separately established connections. The end-to-end path between parties in one direction may have completely different properties compared to the end-to-end path in the opposite direction and the end-to-end path in each direction may be split in one or more parts via different joining transit nodes. Also communication in one direction may result in several independent information flows with different properties in the opposite direction. The end-to-end paths to be used are agreed upon by negotiations between hosts A and B via control signalling functions and the end-to-end paths are not based on the addresses of the hosts that are involved, but instead on the joining points that are to be used.

Anonymity.

The normal way parties interact via the Internet is that an originating party A sends information to a destination party B in packets which are marked with the address of the originating party and the address of the destination party. Each packet will thus contain information that makes it possible to associate a packet stream from A to B with a packet stream from B to A. Malicious intruders on the Internet can use this fact to intercept information and tamper with it. According to this invention and the way of handling return connections described above the relation between individual information flows are only known by the parties that have mutually negotiated how to establish connections. Only transit control nodes have knowledge of the association between two legs; only the end-to-end transit control service node knows about the association between one party and the joining point. With separate joining points for communicating hosts a service providing the connection between the joining points will only know about the joining point and not about which hosts that are involved The above-described method transmits the local address of the originating host A and the local address of the ultimate receiving host B plus an associated transit tag to the departure transit node of the last network along the end-to-end connection. At this node this information is used to repackage the payload into a packet format valid inside the destination network. Since packets on their way from B to A carry tags, which are independent of the tags used from A to B, response packets from B to A cannot be associated with the related packets from A to B. It is only possible to establish the relationship between packets from A to B and from B to A in A's and B's respective access network.

Protection Between Adjacent Networks.

The transit nodes connected to an intermediary network are responsible for preventing hostile parties to inject illegitimate traffic into end-to-end connections. An arrival transit node will only accept and substitute tags on packets that emanate from a known departure transit node in the same intermediary network. This can be implemented by letting the arrival node, i.e. the entity that allots a transit tag, store information about the departure node from which information should arrive. By "stealing" a transit tag that already belongs to a legitimate packet flow an intruder could create traffic out from the current network, provided the intruder also knows the local address used by the departure transit node and has inserted it as the source of the packets. An illegitimate packet injected into an existing connection would then follow that connection to the end-destination but the intruder will not know where it is delivered and neither is he able to get access to any responses. However a stolen tag may be used repeatedly and thus potentially inject lots of adverse traffic. In order to avoid this, the end-to-end service provides tokens that are to be attached to the packets of packet flows at the departure nodes of intermediary networks and then checked by the arrival nodes for validity. There is a unique token, for example a pair of random numbers ass illustrated below, allocated for each packet flow. Packets without valid tokens are discarded and are not propagated to other networks. The method can be implemented in the following manner. When the end-to-end service node sets up a connection through an intermediary network it generates random numbers and associates the random number with the connection. The random numbers for individual flows are distributed to the departure node as well as the arrival node.

A detailed scheme illustrating the above is given below:
1. When a transit path through a network is prepared a random initial sequence number and a random transformation number is stored in the departure node and the arrival node. This number pair is generated individually for each connection (related to each individual tag) and is distributed to the transit nodes via the end-to-end transit control.
2. At the departure transit node the initial sequence number is transformed using the transformation number. The transformed sequence number is then sent with the first transited packet. (For subsequent packets the sequence number is stepped up before each additional packet is transformed and sent.)
3. At the arrival node a reverse transformation is executed in order to reproduce the sequence number that was applied by the departure node. The reproduced number is compared with the sequence number stored in the arrival node. For subsequent packets the reference sequence number stored in the arrival node is stepped up before each additional arriving packet is checked.
4. As long as the check yields a valid result the packets are forwarded along the path. If the check gives an invalid result the packet is dropped and alarm actions can be initiated.

The transform can be based on any reversible manipulation e.g. simply on using XOR operations at both ends. The method avoids that one and the same stolen tag can be used repeatedly. For long-lasting connections new random pairs can be generated at different intervals. To facilitate smooth exchange of active random number pairs the arrival node can check for both the previous pair and the new pair until a first packet with the new pair is received from the departure node.

Source Connection Management

Applications related to the control of the source part of a connection may establish and manage alternative or multiple related data flows. E.g. by mapping one specific incoming tag onto several outgoing tags at a transit node multicast can be established. By inverse actions i.e. mapping one or more incoming tags onto the same outgoing tag the source part control may switch between different sources from where information can be fed into the connection. Connections can be prepared by setting the corresponding tags before any information transfer is activated, disabling a prepared incoming connection and activating another can then perform switching between different sources. To support the use of tags for building connections in preparation for potential future needs the number of tags that are available at a transit node should be larger then the number of active connections that can be handled.

Destination Connection Management

Applications related to the control of the destination part of a connection may establish and manage alternative or multiple related data flows. E.g. by mapping one specific incoming tag onto several outgoing tags at a transit node multicast can be established i.e. the same information flow may be made available at several devices/locations under the control of the receiving party. By the inverse actions i.e. mapping one or more incoming tags onto the same outgoing tag the destination connection part control may switch between different sources from where information can be fed into the same connection. As with source connections management connections can be prepared by setting the corresponding tags before any information transfer is activated. To support the use of tags for building connections in preparation for potential future needs the number of tags that are available at a transit node should be larger then the number of active connections that can be handled.

Trunk Connections

Multiplexing of flows that are to be treated identically until they reach a de-multiplexing point can be achieved by at the multiplexing point using a common unique aggregate tag to all flows that are members of one and the same aggregate. All individual flows belonging to the same aggregate are then transited using a common path (using the same sequence of tags) up to the de-multiplexing point. In order to be able to separate the individual flows at the de-multiplexing point an individual aggregate member tag is allocated for each individual flow. These tags are created by the de-multiplexing node and then distributed to the multiplexing node by an end-to-end service similar to how transit tags are handled. At the arrival node they are used for mapping the incoming packets onto different onwards directions (tags).

A multiplexed path can span several transit legs and members of an aggregate may travel individually or in groups. (In groups means that aggregate packets are used that contain one aggregate transit part and several member parts with individual aggregate member tags.)

Standby Connections

By making use of the possibility to allocate transit tags for connections that are not active standby connections can be prepared for connections that require a high level of availability. The standby connections can then be activated when needed.

Mobility Support

The problems of the Internet that occur when a mobile host has to change its address during an ongoing communication is avoided by letting each end of an end-to-end connection control its part of the connection and by using locally defined tags, not addresses, for building connections. With the ends based routing process described above each host can join a new departure or arrival path to an existing joining transit node by using the existing transit node and tag and by preparing an alternative departure or arrival path to it. Using this solution each party is responsible for adjusting its own part of a connection when moving between different networks and different addresses in a way so that other parties are not affected. By beforehand creating alternative paths to/from existing joining transit nodes each party can prepare for switching to alternative departure or arrival paths. The solution can also be applied to situations when a source multicasts information to several independently moving hosts that are joined at the same joining transit node or when information provided at a joining transit node are fed from different locations during different periods of a communication.

Moving Networks

If a number of hosts are connected to a common network and that network is moving the shared links to other networks may have to be changed from time to time. Using local joining points in the moving network a separate service may prepare for handover to new links to other networks and to joining points in the other networks associated with the new links. The new joining points in the other networks should be prepared for connection to existing joining points for the existing connections. Different classes of services may be handled separately with regard to preparing for handover. Some applications may require smooth handover while others can accept loosing the connection and then create a new connection when a new link is established. Still other applications may accept loosing the connection and then establish communication via a different network.

Service Differentiation and Differentiated Transit Service Charging

Service differentiation and differentiated charging for transit services may be implemented by associating service commitments i.e. service level agreements and agreed traffic volumes with transit tags. (N.B. the transit service charging is intended for settlements between service providers and they do not necessarily automatically translate to end user charging. Transit service charging most probably will occur on a bulk basis and the provider of the transit service does not need to know about the end user using it but only the transit control service that mediates the service.) An arrival transit node may provide transit services to many different transit control nodes and transit control nodes in their turn may serve several end-to-end (or end-to-join) control nodes. Transit tags are allotted to transit control nodes in line with their respective agreed service agreements. Separate sets of tags are allocated for different transit nodes and each tag is valid for an associated class of service. Accounting is based on supervision of the traffic associated with individual tags or separate sets of tags according to tag attributes.

The invention claimed is:

1. A system of networks comprising a plurality of linked intermediate networks for providing an end-to-end connection between a system entry node and a system exit node, wherein:
  each intermediate network is connected to an incoming transit node and an outgoing transit node, between which a leg of the end-to-end connection is transported;
  the incoming and outgoing transit nodes of an individual intermediary network are connected to links between adjacent intermediary networks;
  an end-to-end service node is adapted to select intermediary networks and links which the end-to-end connection shall pass, and to set up connection legs through selected intermediary networks and links; and,
  transit control nodes are adapted to set up, control and administrate said end-to-end connection over said selected links between intermediary networks;
  wherein said entry and exit nodes comprise transit nodes;
  wherein said incoming and outgoing transit nodes comprise inward and outward portions, said inward portions comprising functionality for handling of packets according to the networking technology used locally in an intermediary network, and said outward portions comprising functionality for handling link technologies;
  wherein, in each intermediary network, the incoming transit node has a link tag table and the outgoing transit node has a transit tag table, wherein the portion of an end to end connection on a link to an incoming transit node is associated with a locally defined link tag and the leg of an end-to-end connection across an intermediary network is associated with a locally defined transit tag, and wherein, for an individual end-to-end connection, the link tag of packets at the incoming transit node are replaced with a transit tag used for transit of said end-to-end connection across said individual intermediary network; and,
  wherein said transit tag has been requested by said end-to-end service node from said outgoing transit node and is transferred to said incoming transit node for storage in a table.

2. The system according to claim 1, wherein the incoming transit node has means for converting a package format at its outward portion to the local packet format at said inward portions.

3. The system according to claim 1, wherein a link between intermediate networks is established by a transit control node.

4. The system of claim 1, wherein a source host has at least one access network for access to the entry node, and a destination node has at least an access network for access to the exit node characterized in that the end-to-end node assigns each individual end-to-end connection a unique identity.

5. The system of claim 4, wherein said incoming transit node replaces the sender address of an incoming package with an address which is valid in the intermediary network, or if said node is the entry node with a link tag, and replaces the receiver address of said package with the local address of said outgoing transit node in the intermediate network or, if said node is the exit node, with the address the destination host has in its access network, said replacements being made separate for each individual packet flow associated with an end-to-end connection.

6. The system of claim 4, wherein said sender address replacement is made at the entry transit node.

7. A method to prepare for transit and to execute transit of packets across a packet switched network comprising a plurality of linked intermediate networks, the packets being transited from an entry transit node to an exit transit node both connected to a respective intermediate network, wherein:
  the outgoing transit node allocates each separate packet flow a unique transit tag and signals, for each packet flow, said transit tag and its own local address to the incoming transit node thus completing the transit preparation; and,
  the incoming transit node performs the steps of:
    receiving each incoming packet and identifying the packet flow to which it belongs;
    moving the payload of each incoming packet that belongs to an identified packet flow into the payload of a new packet formatted in accordance with the technology used internally in the network; applying the respective transit tag to each such identified packet;
    marking the new packet with said local address of the outgoing transit node as its destination address; and,
    forwarding the new packet to the outgoing transit node using the intermediary network's own internal network technology for routing, wherein the outgoing transit node uses the transit tag applied to each arriving packet to determine to which packet flow the arriving packet belongs, thus completing the transit of packets across the network.

8. The method of claim 7, wherein said preparation phase comprises the steps of:
  selecting, based on connectivity information, for each end-to-end connection, intermediary networks the respective end-to-end connections should pass;
  signaling to the outgoing transit nodes in each selected network a request to prepare for the transit of an individual end-to-end connection without identifying the respective end-to-end connection; and,
  the outgoing transit nodes in each of the selected networks, in response to each requested end-to-end connection, executing the steps in the preparation phase, and the incoming and outgoing transit nodes in each of the selected networks completing the transit of packets across the respective networks.

9. The method in accordance with claim 8, wherein in the preparation phase:
  links are selected that the end-to-end connections should traverse between selected intermediary networks, thereby also selecting transit nodes that should be involved in transferring the end-to-end connections from one selected network to another;
  the transit node sitting at the end of a link that enters a selected network, that is the incoming transit node, allocates each separate packet flow over the respective links a unique link tag and signals, for each packet flow, said link tag to the outgoing transit node of the same respective link, thus completing the transit preparation;
  for each packet flow and each selected link, the corresponding outgoing transit node performs the following steps:
    receiving an incoming packet and identifying the packet flow to which it belongs;
    applying the respective link tag to each such identified packet; and, forwarding the packets with applied link tags to the incoming transit node at the outgoing end of the link, and that the incoming transit node uses the link tag applied to each arriving packet to determine to which packet flow the arriving packet belongs, thus completing the transit of packets across the respective link.

10. The method in accordance with claim 9, wherein separate locally defined sets of transit tags are used at different transit nodes.

11. The method in accordance with claim 9, wherein a transit tag is associated with a class of service.

12. The method in accordance with claim 9, wherein a transit tag is associated with a charging attribute.

13. The method in accordance with claim 9, wherein a transit tag is associated with an admission attribute.

14. The method in accordance with claim 9, wherein transit tags are cached and subsequently reused for different data flows.

15. The method in accordance with claim 9, wherein the quality with which an end-to-end connection is transited across a network is supervised by transit nodes, said supervision being provided by adding time stamps, sequence numbers etc. at the incoming transit node of a respective network and validating them versus limit values at the outgoing transit nodes of said network.

16. The method in accordance with claim 15, wherein an address allocated for fault reporting is inserted in the source address field of the packets, said address pointing to a transit node, transit control node, an end-to-end service node or other node to which faults are reported.

17. The method in accordance with claim 9, wherein:
the identity of a source host and the identity of a destination host are signaled to the incoming transit node of the last network as seen in the direction of the end-to-end connection at connection set-up; and,
the original source and destination addresses are removed from the transited packets, thus providing an end-to-end protection of the end-to-end connection.

18. The method in accordance with claim 9, wherein the outgoing transit node stores information about the incoming transit node from which the packets of each packet flow should arrive, thus providing protection between adjacent networks.

19. The method in accordance with claim 9, wherein the end-to-end service node and/or the outgoing transit node generates a token which is distributed to the incoming and outgoing transit nodes, that the incoming transit node scrambles the token and inserts it into the packets, that the outgoing transit node receives the packets, de-scrambles the token and compares it with the original token, and that if they agree the packet is allowed, and that if they do not agree the packet is rejected, thus allowing for protection between adjacent networks.

20. The method in accordance with claim 9, wherein the end-to-end connection is divided in a departure path extending from a source host to a common joining transit node, and an arrival path extending from the destination host to the joining transit node, wherein the source and destination hosts have agreed upon which transit node should be used as joining transit node as well as upon a transit tag for joining the departure and arrival parts, thereby allowing the destination host to control the route its incoming traffic should follow and the source node to control the route its outgoing traffic shall follow.

21. The method in accordance with claim 20, wherein any of the destination host and source host requests an alternative path be set up to the joining transit node and that the transit tag agreed upon is used for set up of the alternative path, thus providing mobility to a host.

22. The method in accordance with claim 8, wherein an end-to-end service node (i) selects the networks which the end-to-end connection should traverse, and thus the transit nodes that are to be involved; (ii) selects the links that are to be used between the selected networks; (iii) controls the allocation and distribution of transit tags to be used in selected intermediary networks and links; and (iv) coordinates the mapping between link tags and transit tags used in an end-to-end connection.

23. The method in accordance with claim 7, wherein links between intermediary networks are administered and setup by transit control nodes that control the allocation and distribution of link tags to be used between the incoming transit node in one intermediary network and the outgoing transit node in the previous network.

* * * * *

UNITED STATES PATENT AND TRADEMARK OFFICE
CERTIFICATE OF CORRECTION

| | |
|---|---|
| PATENT NO. | : 7,656,868 B2 |
| APPLICATION NO. | : 10/586975 |
| DATED | : February 2, 2010 |
| INVENTOR(S) | : Jonsson |

It is certified that error appears in the above-identified patent and that said Letters Patent is hereby corrected as shown below:

In Column 10, Line 65, delete "are ** o be treated," and insert -- are to be treated, --, therefor.

Signed and Sealed this

Fourth Day of May, 2010

David J. Kappos
*Director of the United States Patent and Trademark Office*